(12) United States Patent
Kraemer et al.

(10) Patent No.: US 11,334,283 B2
(45) Date of Patent: May 17, 2022

(54) METHOD FOR PROVIDING APPLICATION DATA OF AT LEAST ONE APPLICATION EXECUTABLE ON A CONTROL UNIT OF A VEHICLE, METHOD FOR CALIBRATING A CONTROL UNIT, CONTROL UNIT AND EVALUATION UNIT

(71) Applicant: Robert Bosch GmbH, Stuttgart (DE)

(72) Inventors: Florian Kraemer, Pfedelbach (DE); Maksym Shchetynin, Holzgerlingen (DE); Michael Deckert, Lehrensteinsfeld (DE); Patrick Nagel, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 16/971,910

(22) PCT Filed: Mar. 19, 2019

(86) PCT No.: PCT/EP2019/056775
§ 371 (c)(1),
(2) Date: Aug. 21, 2020

(87) PCT Pub. No.: WO2019/192835
PCT Pub. Date: Oct. 10, 2019

(65) Prior Publication Data
US 2021/0103401 A1 Apr. 8, 2021

(30) Foreign Application Priority Data
Apr. 6, 2018 (DE) .......................... 102018205204.2

(51) Int. Cl.
*G06F 3/06* (2006.01)

(52) U.S. Cl.
CPC .......... *G06F 3/0655* (2013.01); *G06F 3/0604* (2013.01); *G06F 3/0662* (2013.01); *G06F 3/0679* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 7,636,772 B1* 12/2009 Kirby .................. G06F 13/4022
370/278
2004/0107419 A1* 6/2004 Blackmore ............. G06F 9/544
718/100
(Continued)

FOREIGN PATENT DOCUMENTS

DE 10064000 A1 7/2001
JP 2010152527 A 7/2010
(Continued)

OTHER PUBLICATIONS

N. Ayres, L. Deka and B. Passow, "Virtualisation as a Means for Dynamic Software Update within the Automotive E/E Architecture," 2019 IEEE Smartworld, (SmartWorld/SCALCOM/UIC/ATC/CBDCom/IOP/SCI), 2019, pp. 154-157, doi: 10.1109/SmartWorld-UIC-ATC-SCALCOM-IOP-SCI.2019.00068. (Year: 2019).*
(Continued)

*Primary Examiner* — Daniel C. Chappell
(74) *Attorney, Agent, or Firm* — Norton Rose Fulbright US LLP; Gerard Messina

(57) ABSTRACT

A method for providing application data of at least one application executable on a control unit of a vehicle. The control unit includes components for running an operating system including a virtual memory management. In the method, an application address space of a first virtual
(Continued)

memory is initially read out, the application address space being assigned to a process of the application and representing an area of a physical memory of the control unit occupied by the application data. The application address space is mapped in a further step into a virtual address space, which is assigned to a process of a communication application for exchanging data via a communication interface to a control unit-external evaluation unit. The application data are therefore retrievable via the communication interface.

11 Claims, 4 Drawing Sheets

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | |
|---|---|---|---|---|
| 2006/0047794 A1* | 3/2006 | Jezierski | ............. | H04L 41/0823 709/221 |
| 2006/0047898 A1* | 3/2006 | Ishida | ................... | G06F 3/0623 711/112 |
| 2007/0250629 A1* | 10/2007 | Blanding | ............ | H04L 41/5009 709/226 |
| 2012/0154413 A1* | 6/2012 | Kim | ................... | H04M 1/72448 345/530 |
| 2012/0311592 A1* | 12/2012 | Kim | ...................... | G06F 9/4887 718/102 |
| 2014/0163810 A1* | 6/2014 | Roettger | ............ | G05B 23/0267 701/32.7 |
| 2016/0125951 A1* | 5/2016 | Sun | ....................... | G11C 29/021 365/185.24 |
| 2017/0046358 A1* | 2/2017 | Lee | ..................... | G06F 12/1009 |
| 2019/0132311 A1* | 5/2019 | Koshimae | ............... | H04L 67/12 |
| 2020/0004441 A1* | 1/2020 | Hahn | .................... | G06F 3/0622 |
| 2020/0042341 A1* | 2/2020 | Gupta | .................... | G06F 3/0662 |
| 2020/0319949 A1* | 10/2020 | Golov | .................. | B60R 16/0231 |
| 2021/0081325 A1* | 3/2021 | Bradshaw | ............... | G06F 3/0649 |
| 2021/0089477 A1* | 3/2021 | Kachare | ................... | G06F 9/547 |
| 2021/0132865 A1* | 5/2021 | Hayes | .................... | G06F 3/0659 |
| 2021/0256782 A1* | 8/2021 | Ehlers | .................... | G06Q 10/20 |
| 2022/0004330 A1* | 1/2022 | Guim Bernat | ........ | G06F 3/0647 |

FOREIGN PATENT DOCUMENTS

| WO | 2007097036 A1 | 8/2007 | | |
|---|---|---|---|---|
| WO | WO-2018057167 A1 * | 3/2018 | ........... | G06F 21/572 |

OTHER PUBLICATIONS

A. S. Jahan, I. Hoq and D. Westerfeld, "GPS enabled speed control embedded system speed limiting device with display and engine control interface," 2013 IEEE Long Island Systems, Applications and Technology Conference (LISAT), 2013, pp. 1-7, doi: 10.1109/LISAT.2013.6578244. (Year: 2013).*

J. Y. Moon, D. Y. Kim, J. H. Kim and J. W. Jeon, "The Migration of Engine ECU Software From Single-Core to Multi-Core," in IEEE Access, vol. 9, pp. 55742-55753, 2021, doi: 10.1109/ACCESS.2021.3071500. (Year: 2021).*

International Search Report for PCT/EP201 9/056775, dated Jun. 3, 2019.

* cited by examiner

METHOD FOR PROVIDING APPLICATION DATA OF AT LEAST ONE APPLICATION EXECUTABLE ON A CONTROL UNIT OF A VEHICLE, METHOD FOR CALIBRATING A CONTROL UNIT, CONTROL UNIT AND EVALUATION UNIT

FIELD

The present invention is directed to a method and to a device for providing application data of at least one application executable on a control unit. The present invention is also directed to a computer program.

BACKGROUND INFORMATION

Conventional microcontrollers including integrated peripheral components such as, for example, flash or RAM memories are generally used in control units of motor vehicles. Such components usually have no memory virtualization mechanism that includes a memory management unit, or MMU for short. The measurement and adjustment of parameters is facilitated via the XCP protocol (Universal Measurement and Calibration Protocol). In this case, arbitrary memory cells are read out and displayed on a metrology computer. Due to the lack of a memory management unit, such control units are usually not suited for the use of modern operating systems such as Linux or QNX.

Modern microprocessors, which have fast processing units, external memories and memory management units, are today already used in infotainment control units. Occasionally, operating systems are employed here, which use memory visualization. In this case, primarily simple logging mechanisms are used, which limit the parameterization of the system.

Modern operating systems and microprocessors play an important role in driver assistance systems. These require comprehensive measuring and calibration possibilities.

SUMMARY

In accordance with example embodiments of the present invention, a method for providing application data of at least one application executable on a control unit of a vehicle, a control unit that uses this method, a method for calibrating a control unit, an evaluation unit that uses this method and, finally, a corresponding computer program are provided. Advantageous refinements of and improvements on the example method and device are possible with the measures described herein.

The approach presented herein is based on the finding that in a microprocessor, as it is used, for example, in control units for driver assistance systems, a PMD (PMD=Process Measurement Daemon) or another communication application executable in a virtual memory may be used for communication with a control unit-external measuring computer. This enables a simple reading out of measured and calibration data from different allocated memory areas of the microprocessor, specifically, regardless of an actual memory mapping of the virtual memory management.

The approach presented herein describes, among other things, how a measuring and calibration interface may be used with XCP on microprocessors that include modern operating systems and memory virtualization. This possibility is essential for driver assistance control units, for example, for autonomous driving. In particular, the approach presented herein enables, for example, the implementation of an XCP metrology interface among POSIX-compatible operating systems (Portable Operating System Interface).

This has the advantage that a previously established metrology protocol including corresponding PC tools may continue to be used in driver assistance control units. Thus, new microprocessor-based systems including memory virtualization may continue to be analyzed and calibrated using established measuring tools. In light of the far-reaching technological changes in control units, it is thus possible to reduce to a minimum the adaptation effort in the area of metrology.

In accordance with an example embodiment of the present invention, a method is provided for providing application data of at least one application executable on a control unit for a vehicle, the control unit including components for running an operating system that includes virtual memory management, the method including the following steps:

reading out an application address space of a first virtual memory, the application address space being assigned to a process of the application and representing an area of a physical memory of the control unit occupied by the application data; and mapping the application address space of an additional virtual memory into a virtual address space, which is assigned to a process of a communication application for exchanging data via a communication interface to an external evaluation unit, in order to provide the application data via the communication interface.

The application data may be measured data or calibration data, for example. The application data may be or may have been used and/or created by the process of the application. A control unit may be understood to mean, for example, an engine control unit or a device for controlling driver assistance functions. An application may be understood to mean a computer program or a software. An application may be understood to mean, for example, an instance of a program functioning as a slave. The application may be executable, in particular, within a virtual process area. The components may be understood to mean, for example, a microprocessor or microcontroller or a volatile or non-volatile memory. The operating system may be, in particular, a POSIX-conforming operating system, in particular, also a real-time operating system such as, for example, Linux or QNX. Virtual memory management may be understood to mean a type of memory management, in which the memory addresses generated by an application form a virtual address space, the addresses of which go not directly to a memory bus, but to a memory management unit. The memory management unit maps the virtual addresses onto addresses of the actually present physical memory. In this sense, a virtual address space may be understood to mean an address space independent of the physical memory, which the operating system assigns to a process. Accordingly, an application address space may be understood to mean a virtual address space assigned by the operating system to a process of the application which, in turn, refers to a particular address space of the physical memory. The application address space of an application and/or the virtual address space of the communication application may include data in the form of pointers, which refer to memory sections of the physical memory. A physical memory may be understood to mean a volatile or non-volatile memory, for example, in the form of a flash memory or RAM memory. The physical memory may, for example, be integrated into the microprocessor or microcontroller of the control unit or implemented as an external memory. A communication application may be understood to mean, in particular, a programming tool for code analysis, for example, a process measurement daemon, a so-called PMD, or the like. A communication interface may be understood to mean a measuring and calibration interface for exchanging measured data and calibration data, for example, via the XCP protocol or another suitable network protocol. The communication interface may be designed on the hardware side as a radio interface or cable-connected interface, for example, as an Ethernet interface. A control unit-external evaluation unit may be understood to mean, for example, a measuring and calibration computer couplable to the control unit, for example, in the form of a laptop or PC. The communication interface may include a protocol layer, which is separated from the transport layer so that, for example, a transport layer based on the CAN bus may be used.

According to one specific example embodiment of the present invention, the application data may be provided in a step of providing as the communication interface via an XCP interface. An XCP interface may be understood to mean an interface for exchanging data via a standardized measuring and calibration protocol for the control unit calibration, also referred to as Universal Measurement and Calibration Protocol. In this way, the universal applicability of the method may be ensured.

The process of the communication application may be designed in order to carry out the step of reading out and the step of mapping without the aid of a hardware unit for the memory management. The control unit may thus be designed without a so-called MMU (Memory Management Unit).

According to a further specific embodiment of the present invention, at least one physical and/or virtual address of the application data may be read out as the application address space in the step of reading out. A physical address may be understood to mean a location of an occupied area of the physical memory. A virtual address may be understood to mean an area of a virtual memory referring to the physical address. This specific embodiment may ensure an efficient and reliable ascertainment of the application address space.

In addition, the application address space may be mapped in the step of mapping into the virtual address space with the aid of a POSIX-based operating system. A POSIX-based operating system may be understood to mean a POSIX-conforming, largely POSIX-conforming operating system, or operating system made POSIX-conforming via expansions of compatibility. With this specific embodiment, it is possible to implement a highly efficient memory management.

According to a further specific embodiment, the application address space may be read out in response to a predetermined event of the process assigned to the application. For example, the step of reading out may be carried out in response to a start or completion of the process assigned to the application. In this way, it is possible, for example, to read out constantly updated data via the communication interface.

In the step of reading out, a second virtual application address space of a second virtual memory may be read out, which is assigned to a process of a second application executable on the control unit and which represents an area of the physical memory occupied by second application data of the second application. Accordingly, the second application address space may be mapped in the step of mapping into the virtual address space in order to provide the second application data via the communication interface. The second application data may be or may have been used and/or created by the process of the second application. Through the ability of multiple virtual memories of multiple applications to be accessed by the process of the communication application, it is possible to read out and calibrate together data of multiple different applications of the control unit via the communication interface.

The approach presented herein further provides a control unit, which is designed to carry out, activate or implement the steps of a variant of a method presented herein in corresponding units. With this embodiment variant of the present invention in the form of a control unit as well, it is possible to quickly and efficiently achieve the object underlying the present invention.

For this purpose, the control unit may include at least one processing unit for processing signals or data, at least one memory unit for storing signals or data, at least one interface to a sensor or to an actuator for reading in sensor signals from the sensor or for outputting control signals to the actuator and/or at least one communication interface for reading in or outputting data, which are embedded in a communication protocol. The processing unit may, for example, be a signal processor, a microcontroller or the like, the memory unit capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A control unit in the present case may be understood to mean an electrical device which processes sensor signals and, as a function thereof, outputs control signals and/or data signals. The control unit may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made at least partly of discrete components. In a software design, the interfaces may be software modules, which are present, for example, on a microcontroller alongside other software modules.

In one advantageous embodiment of the present invention, a control of the vehicle takes place via the control unit. For this purpose, the control unit may, for example, access sensor signals such as, for example, acceleration signals, pressure signals, steering angle signals or surroundings sensor signals. The activation may take place via actuators such as brake actuators or steering actuators or via an engine control unit of the vehicle According to one specific embodiment of the present invention, the control unit may include as the units at least one microprocessor, one physical memory, one first virtual memory assigned to the application and one second virtual memory assigned to the communication application. In this way, the control unit may be implemented having high computing power with comparatively low manufacturing costs and minimal space requirements.

The present invention described herein further provides an example method for calibrating a control unit using application data that have been provided in a method according to one of the preceding specific embodiments. In accordance with an example embodiment of the present invention, the method includes the following steps:

reading in the application data via the communication interface using the communication application;

generating a piece of calibration information for adjusting at least one parameter of the control unit using the application data; and outputting the piece of calibration information to the communication interface in order to calibrate the control unit.

A piece of calibration information may, for example, be understood to mean a description file for control unit-internal variables, for example an A2L file, or another piece of information suitable for carrying out measuring or adjustment operations.

These aforementioned methods may, for example, be implemented in software or in hardware or in a mixed form made up of software and hardware, for example, in a control unit.

The present invention also provides an evaluation unit including units, which are designed to carry out and/or to activate the method according to the preceding specific example embodiments.

An evaluation unit may be understood to mean a control unit-external or vehicle-external computer.

Also advantageous in accordance with the present invention is a computer program product or computer program having program code, which may be stored on a machine-readable medium or memory medium, such as a semiconductor memory, a hard disk memory or an optical memory, and which is used for carrying out, implementing and/or activating the steps of the method according to one of the previously described specific embodiments, in particular, when the program product or program is executed on a computer or a device.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
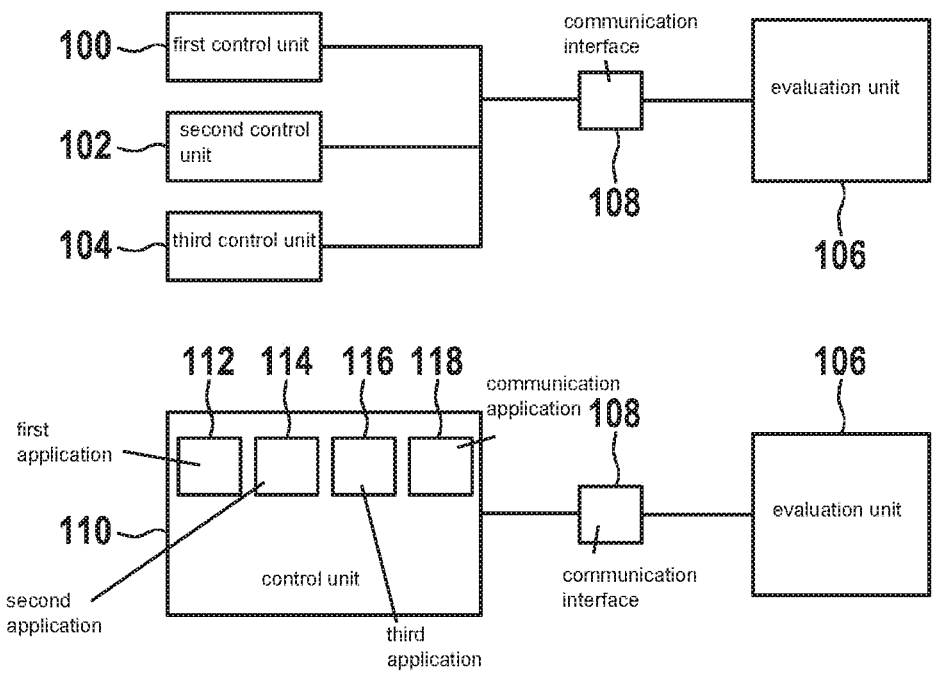
FIG. 1 schematically shows a representation of a topology of Multi-XCP slaves.

In the following description of preferred exemplary embodiments of the present invention, identical or similar reference numerals are used for elements which are represented in the various figures and act similarly, a repeated description of these elements being omitted.

FIG. 1 schematically shows a representation of two topologies of Multi-XCP slaves. For a better comparison, the topologies are depicted one on top of the other and separated from one another by a dashed line.

The upper topology includes, for example, a first control unit 100, which represents a first XCP slave, a second control unit 102, which represents a second XCP slave, and a third control unit 104, which represents a third XCP slave. A control unit-external evaluation unit 106, here for example a metrology PC, is coupled via an XCP interface as communication interface 108 to each of three control units 100, 102, 104 for measuring and calibration purposes. The complete control units 100, 102, 104 are each considered to be an XCP slave. Evaluation unit 106 in this case is able to communicate simultaneously with multiple slaves, for example, with an ESP control unit and an engine control unit, for example, in order to exchange measured and/or calibration data.

The lower topology shows a control unit 110 according to one exemplary embodiment of the approach presented herein. According to the approach presented herein, each instance of an application in control unit 110 is now considered to be an XCP slave, for example. A first application 112, a second application 114, a third application 116 and a communication application 118 are shown, for example, as instances executable in control unit 110. Communication application 118 is designed to communicate with evaluation unit 106 via an external communication interface 108, i.e., to write data into respective control unit 110 or to read out data from control unit 110.

Control unit 110 shown in the lower topology, for example, a POSIX control unit including virtual memory management, is coupled via communication interface 108 to evaluation unit 106, similar to control units 100, 102, 104 shown in the upper topology. The various applications 112, 114, 116, 118 are executable on control unit 110 in corresponding virtual memory areas of an operating system. In this case, first application 112 represents a first XCP slave, second application 114 represents a second XCP slave and third application 116 represents a third XCP slave. In addition, communication application 118 is executable on control unit 110, for example, for exchanging measured data and calibration data via communication interface 108. According to this exemplary embodiment, communication application 118 is a process measurement daemon, PMD for short, for the external code analysis with the aid of evaluation unit 106.

According to one exemplary embodiment of the present invention, control unit 110 is designed to read out an application address space from application data of application 112, for example, of measured data and calibration data, with the aid of the operating system. The application address space in this case represents a physical memory area of control unit 110 occupied by the application data. In order to make the application data accessible via communication interface 108, control unit 110 maps the application address space into a virtual process area of communication application 118. Thus, the application data are referenced in the virtual memory of communication application 118 and retrievable via communication interface 108 with the aid of evaluation unit 106 regardless of an actual memory mapping of control unit 110.

According to one further exemplary embodiment of the present invention, control unit 110 is designed, in addition to the application address space of application 112, to read out additional application address spaces of the respective application data of the two applications 114, 116 and to map them into the virtual address space of communication application 118, so that the application data of the two applications 114, 116 may also be accessed via the virtual address space of communication applications 118.

According to one exemplary embodiment of the present invention, control unit 110 does not include a hardware unit for the memory management. Instead, communication application 118 is designed to access directly the physical memory. Communication application 118 is further designed to read out directly virtual memories of applications 112, 114, 116 or to receive application address spaces encompassed by the virtual memories of applications 112, 114, 116.

According to one exemplary embodiment of the present invention, control unit 110 is situated in a vehicle and evaluation unit 106 is also situated in the vehicle or outside the vehicle. For example, evaluation unit 106 is coupled only temporarily to control unit 110 via communication interface 108, for example, during a workshop visit.

Figure 2:
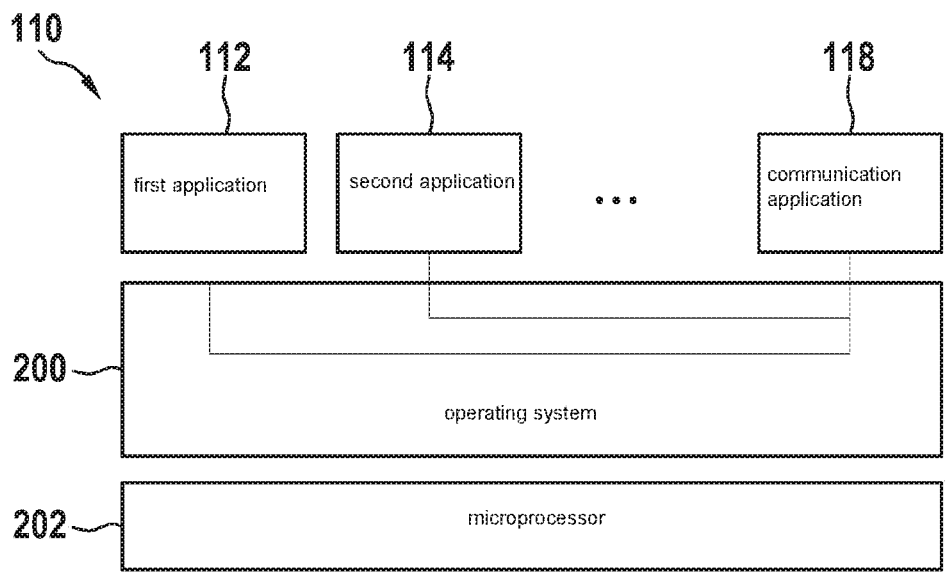
FIG. 2 schematically shows a representation of a control unit from FIG. 1.

FIG. 2 schematically shows a representation of control unit 110 from FIG. 1 according to one exemplary embodiment of the present invention. A software architecture based on a POSIX real-time operating system 200, which manages the processes of the various applications 112, 114, 118, and based on a microprocessor 202 as a processing unit, are shown.

According to this exemplary embodiment, control unit 110 includes multiple programs or applications 112, 114 independent of one another in the form of ELF files (ELF=Executable and Linking Format), situated in a binary manner in a non-volatile memory of control unit 110. First application 112, for example, is based on an ELF-file "A.elf", second application 114 is based on an ELF file "B.elf", an x-th application is based on an ELF file "X.elf".

At the start of applications 112, 114, 118, an operating system loader ensures that the necessary resources are physically allocated. In the process, physical memory pages, for example, a 4 KB, are reserved and mapped to a potentially different address in the respective virtual address space, also referred to as application address space, of the process of respective application 112, 114, 118, as it is described below with reference to FIG. 3.

Figure 3:
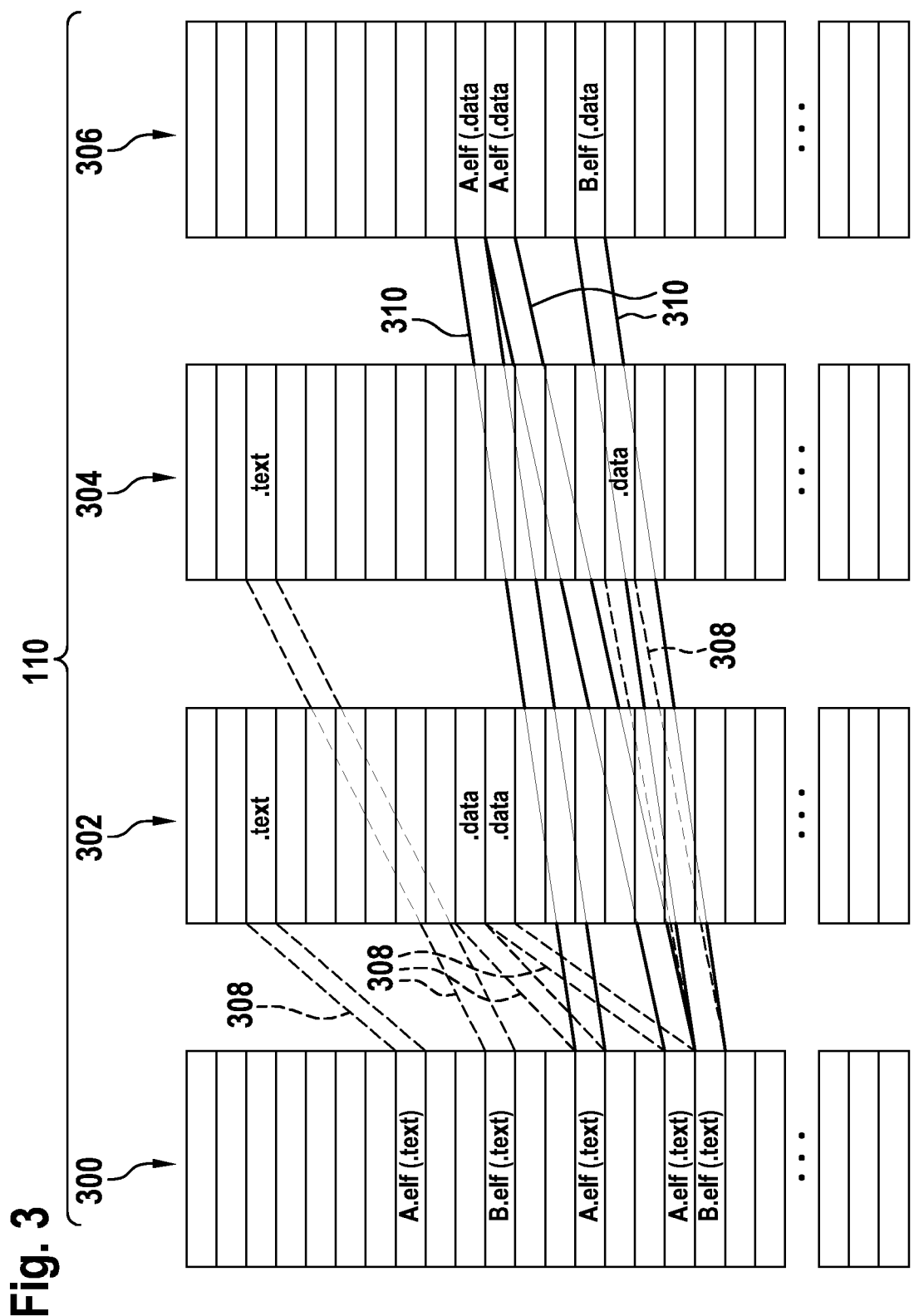
FIG. 3 schematically shows a representation of a memory organization in a control unit according to one exemplary embodiment of the present invention.

FIG. 3 schematically shows a representation of a memory organization in a control unit 110 according to one exemplary embodiment, for example, the control unit described above with reference to FIGS. 1 and 2. A physical memory 300 of control unit 110 is shown, as well as for example, a first virtual memory 302 representing a virtual process area of the first application, a second virtual memory 304 representing a virtual process area of the second application, as well as an additional virtual memory 306, which is assigned to the communication application, here, the process measurement daemon. First virtual memory 302 is, for example, assigned to an application or to a process A.elf and second virtual memory 304 is assigned to an application or to a process B.elf.

The four memories 300, 302, 304, 306 are each schematically depicted as a memory page table including a plurality of rows, each of which represents a particular memory area of equal size including a unique address, for example, including a hexadecimal address of 0x . . . 0000 to 0xF . . . FFFF. Memory areas occupied by the respective application data are marked with the ending "data". Other application-related data are marked with the ending "text".

The .text and .data files of the first application are mapped into first virtual memory 302. Similarly, the .text- and .data-files of the second application are mapped into the second virtual memory. The .data files of both the first and the second application, i.e., their respective application data, are mapped into additional virtual memory 306 and are retrievable from there via the communication interface.

The data contained in first virtual memory 302 may be regarded as application address space of a process of the first application. The data contained in second virtual memory 304 may be regarded as application address space of a process of the second application. The data contained in additional virtual memory 306 may be regarded as virtual address space of additional virtual memory 306.

The application data are provided by the processes to be measured, here for example, the processes A.elf and B.elf of the first and second application, communicating at the start via interprocess communication of the communication application which memory areas exactly contain the respective application data. Pieces of information are conveyed relating, among other things, to physical and virtual addresses of the corresponding data sections. The communication application now maps the physical memory areas of the applications to be measured into its virtual process area, here, additional virtual memory 306. The address space of additional virtual memory 306 may thus represent physical memory areas of the first and second applications related to physical memory 300. An external measuring program, which may be executed in a device situated externally of the control unit, may subsequently communicate with the communication application and query the application data, for example, via Ethernet. The external measuring program in this case requires no knowledge of the memory mapping actually proceeding in control unit 110, with which all known metrologies known from the world of microcontrollers may continue to be used without changes.

The mapping between physical memory 300 and virtual memories 302, 304, 306 is indicated by multiple connecting lines. The connecting lines in this case marked with reference numeral 308 represent a normal program mapping with the aid of MMU, whereas the connecting lines marked with reference numeral 310 represent a measuring and calibration mapping.

Figure 4:
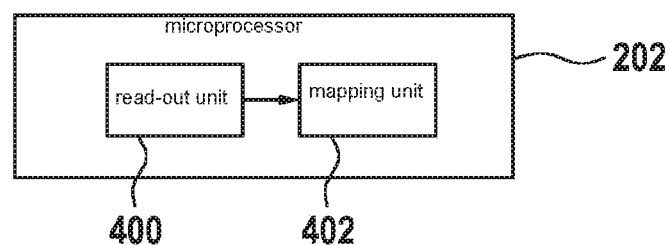
FIG. 4 schematically shows a representation of a microprocessor from FIG. 2.

FIG. 4 schematically shows a representation of a microprocessor 202 from FIG. 2 according to one exemplary embodiment. According to this exemplary embodiment, microprocessor 202 includes a read-out unit 400 for reading out the application address spaces as well as a mapping unit 402 for mapping the application address space into the associated virtual memory of the communication application. Read-out unit 400 and mapping unit 402 may be implemented in software as parts of the communication application and/or as parts of an application of the control unit utilizing a named application address space.

Figure 5:
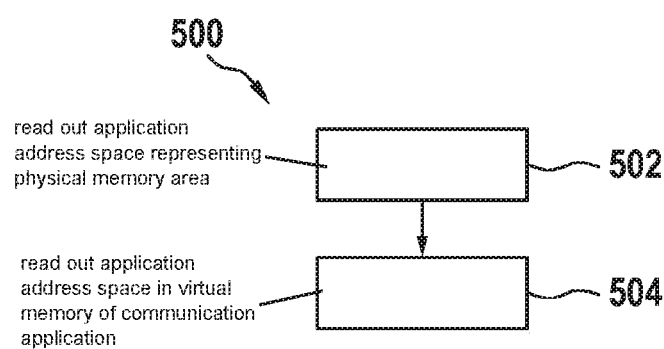
FIG. 5 shows a flow chart of a method for providing application data according to one exemplary embodiment of the present invention.

FIG. 5 shows a flow chart of a method 500 for providing application data according to one exemplary embodiment. Method 500 may, for example, be carried out by a control unit, as it is described above with reference to FIGS. 1 through 4. In this case, the application address space, which represents a physical memory area of the control unit occupied by the application data, is read out in a first step 502. The mapping of the application address space into the virtual memory of the communication application takes place in a further step 504. In this way, the application data are retrievable from the outside via the virtual memory of the communication application.

Figure 6:
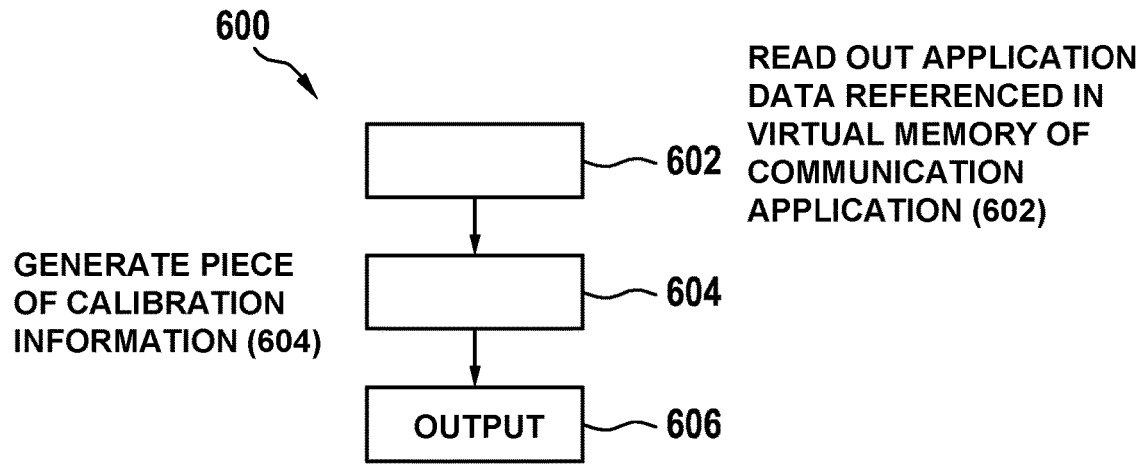
FIG. 6 shows a flow chart of a method for calibrating a control unit according to one exemplary embodiment of the present invention.

FIG. 6 shows a flow chart of a method 600 for calibrating a control unit according to one exemplary embodiment. Method 600 may, for example, be carried out by an evaluation unit, as it is described above with reference to FIG. 1. In this case, the application data referenced in the virtual memory of the communication application are read into the evaluation unit in a step 602 via the communication interface by addressing the communication application. A piece of calibration information, for example, an A2L description file, is generated in a further step 604 using the application data for adjusting control unit-internal parameters. In a step 606, the piece of calibration information or a piece of information derived therefrom is output to the communication interface in order to suitably adjust the relevant parameters in the control unit.

Figure 7:
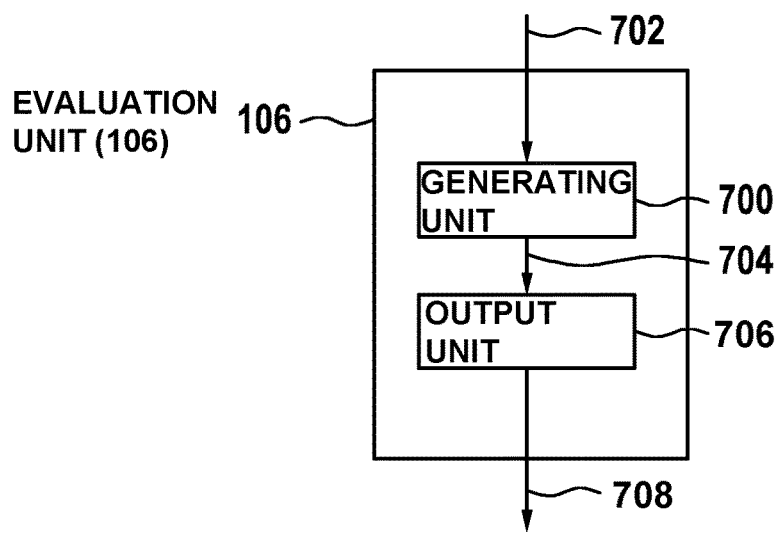
FIG. 7 schematically shows a representation of an evaluation unit according to one exemplary embodiment of the present invention.

FIG. 7 schematically shows a representation of an evaluation unit 106 according to one exemplary embodiment. Evaluation unit 106 includes a generating unit 700, which is designed to generate at least one second data packet 708 representing the piece of calibration information for calibrating the control unit, while using at least one first data packet 702 representing the application data provided by the control unit. An output unit 706 is designed to output second data packet 704 or a data packet based thereon to the communication interface.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for providing application data of at least one application executable on a control unit for a vehicle, the method comprising:
   reading out an application address space of a first virtual memory, the application address space being assigned to a process of the application and representing an area of a physical memory of the control unit occupied by the application data, wherein the control unit includes components for running an operating system including virtual memory management; and
   mapping the application address space into a virtual address space of an additional virtual memory, which is assigned to a process of a communication application for exchanging data via a communication interface to a control unit-external evaluation unit to provide the application data via the communication interface;
   wherein the application address space can be read out in response to a predetermined event of the process assigned to the application, including in response to a start or a completion of the process assigned to the application, so that constantly updated data can be read out via the communication interface.

2. The method as recited in claim 1, further comprising:
   providing the application data via an XCP interface as the communication interface.

3. The method as recited in claim 1, wherein the process of the communication application is configured to carry out the reading out and the mapping, without a hardware unit for memory management (MMU).

4. The method as recited in claim 1, wherein in the reading out, at least one physical address of the application data or virtual address of the application data is read out as the application address space.

5. The method as recited in claim 1, wherein in the mapping, the application address space is mapped into the virtual address space using a POSIX-based operating system of the control unit.

6. The method as recited in claim 1, wherein in the reading out, a second virtual application address space of a second virtual memory, which is assigned to a process of a second application executable on the control unit, and which represents an area of the physical memory occupied by second application data of the second application, is read out, in the mapping, the second application address space is mapped into the virtual address space to provide the second application data via the communication interface.

7. A control unit for a vehicle, comprising:
   units, wherein the control unit is configured to provide application data of at least one application executable on the control unit, and wherein the control unit includes components for running an operating system including virtual memory management;
   wherein the control unit is configured to perform the following:
      reading out an application address space of a first virtual memory, the application address space being assigned to a process of the application and representing an area of a physical memory of the control unit occupied by the application data; and
      mapping the application address space into a virtual address space of an additional virtual memory, which is assigned to a process of a communication application for exchanging data via a communication interface to a control unit-external evaluation unit to provide the application data via the communication interface;
   wherein the application address space can be read out in response to a predetermined event of the process assigned to the application, including in response to a start or a completion of the process assigned to the application, so that constantly updated data can be read out via the communication interface.

8. The control unit as recited in claim 7, wherein the units include a microprocessor, the physical memory, the first virtual memory assigned to the application, and the additional virtual memory assigned to the communication application.

9. A method for calibrating a control unit using application data, the method comprising:
   providing the application data of at least one application executable on the control unit for a vehicle, the control unit including components for running an operating system including virtual memory management, the providing including the following:
      reading out an application address space of a first virtual memory, the application address space being assigned to a process of the application and representing an area of a physical memory of the control unit occupied by the application data, and
      mapping the application address space into a virtual address space of an additional virtual memory, which is assigned to a process of a communication application for exchanging data via a communication interface to a control unit-external evaluation unit to provide the application data via the communication interface;
   reading in the application data via the communication interface using the communication application;
   generating a piece of calibration information for adjusting at least one parameter of the control unit using the application data; and
   outputting the piece of calibration information to the communication interface to calibrate the control unit;
   wherein the application address space can be read out in response to a predetermined event of the process assigned to the application, including in response to a start or a completion of the process assigned to the application, so that constantly updated data can be read out via the communication interface.

10. An evaluation apparatus, comprising:
an evaluation unit configured to calibrate a control unit, for a vehicle, using application data of at least one application executable on the control unit, wherein the control unit includes components for running an operating system including virtual memory management, the application data having been provided by the control unit by reading out an application address space of a first virtual memory, the application address space being assigned to a process of the application and representing an area of a physical memory of the control unit occupied by the application data, and mapping the application address space into a virtual address space of an additional virtual memory, which is assigned to a process of a communication application for exchanging data via a communication interface to the evaluation unit to provide the application data via the communication interface;
wherein the evaluation unit is further configured to perform the following:
reading in the application data via the communication interface using the communication application;
generating a piece of calibration information for adjusting at least one parameter of the control unit using the application data; and
outputting the piece of calibration information to the communication interface to calibrate the control unit;
wherein the application address space can be read out in response to a predetermined event of the process assigned to the application, including in response to a start or a completion of the process assigned to the application, so that constantly updated data can be read out via the communication interface.

11. A non-transitory machine-readable memory medium, on which is stored a computer program, which is executable by a control unit, comprising:
a program code arrangement having program code for providing application data of at least one application executable on the control unit for a vehicle, the control unit including components for running an operating system including virtual memory management, by performing the following:
reading out an application address space of a first virtual memory, the application address space being assigned to a process of the application and representing an area of a physical memory of the control unit occupied by the application data; and
mapping the application address space into a virtual address space of an additional virtual memory, which is assigned to a process of a communication application for exchanging data via a communication interface to a control unit-external evaluation unit to provide the application data via the communication interface;
wherein the application address space can be read out in response to a predetermined event of the process assigned to the application, including in response to a start or a completion of the process assigned to the application, so that constantly updated data can be read out via the communication interface.

\* \* \* \* \*